United States Patent
Kuwahara et al.

(10) Patent No.: US 6,640,107 B1
(45) Date of Patent: Oct. 28, 2003

(54) WIRELESS LOCATION HANDSET APPARATUS

(75) Inventors: Mikio Kuwahara, Kokubunji (JP); Katsuhiko Tsunehara, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 09/639,745

(22) Filed: Aug. 15, 2000

(30) Foreign Application Priority Data

Feb. 22, 2000 (JP) .......... 2000-050453

(51) Int. Cl.[7] .............. H04Q 7/20
(52) U.S. Cl. ............ 455/456.6; 455/67.16; 455/276.1; 455/502; 342/450
(58) Field of Search .......... 455/456–457, 455/67.1, 67.3, 67.6, 276.1, 296, 303, 304, 63, 65, 502; 375/347, 349, 343; 370/335, 342; 342/357, 357.1, 450

(56) References Cited

U.S. PATENT DOCUMENTS

| | | | |
|---|---|---|---|
| 5,754,583 A | * | 5/1998 | Eberhardt et al. .......... 375/147 |
| 5,943,606 A | * | 8/1999 | Kremm et al. ............. 455/12.1 |
| 6,163,696 A | * | 12/2000 | Bi et al. ..................... 455/436 |
| 6,211,820 B1 | * | 4/2001 | Zou et al. ................. 342/357.1 |

FOREIGN PATENT DOCUMENTS

| | | |
|---|---|---|
| EP | 0881780 A2 | 12/1998 |
| JP | 7-181242 | 7/1995 |
| WO | WO 99/31816 | 6/1999 |

OTHER PUBLICATIONS

Y. Wang et al, "Mobile Based Pilot Long Integration for Position Location", Wireless Communications and Networking Conference, IEEE, 1999, pp. 291–295.

* cited by examiner

Primary Examiner—Dwayne Bost
Assistant Examiner—Ronald J. Ward
(74) Attorney, Agent, or Firm—Mattingly, Stanger & Malur, P.C.

(57) ABSTRACT

A periodical signal is transmitted from a cellular base station. A memory circuit having a capacity of the signal for one cycle is provided. Newly received information is added to information previously accumulated in the memory circuit, and the resultant information is again accumulated in the memory circuit, thereby enabling the received information to be stored in the memory circuit having the capacity for only one cycle of the signal. Conventionally, a large amount of memory has been required to perform coherent adding for a long time period, whereas the present invention can reduce the circuit scale and the amount of memory, and also reduce the number of times of operations required for the long-period coherent adding, when a mobile station is located using a cellular communication system.

5 Claims, 4 Drawing Sheets

WIRELESS LOCATION HANDSET APPARATUS

BACKGROUND OF THE INVENTION

1. Field of the Invention

The present invention relates to a mobile station which is located by use of cellular communications.

2. Description of the Related Art

JP-A-7-181242 discloses a CDMA-based system in which respective base stations are GPS synchronized in accordance with a cellular scheme. In this system, a mobile station is located by observing a reception timing of a pilot signal transmitted from each base station.

FIG. 3 illustrates exemplary results of correlation calculations. The illustrated graphs, referred to as "delayprofiles," show which delayed paths are observed. The horizontal axis represents a delay time, i.e., the reception timing which has been compensated for by transmission timing. The delay time is represented in units translated to the number of chips of a spread code. The vertical axis represents the output of the correlation calculation, where a large correlation value indicates reception of signal, i.e., existence of a path. Using these results, it is possible to find a relative delay time of a wave required to propagate from a base station to a mobile station. Here, the delay time is represented by a relative value since the absolute time is unknown at a mobile station. the found relative delay time may be multiplied by the velocity of light to find a pseudo range. When the pseudo ranges can be found for at least three base stations or more, the position of a mobile station can be estimated through triangulation.

A mobile station may estimate the position of a path using a correlation calculating circuit (despreading circuit) for detecting signals from base stations. For further estimating the position of the path in greater details, a delay profile as illustrated in FIG. 3 is created to pick up several points of the phase at which the code exhibits peaks. Then, the points are interpolated to estimate a possible peak which may exist within a sample interval. In this way, the position detection involves the despreading for multiple points on the signal phase. However, a hardware provided with a large number of despreading circuits in parallel would result in an increased scale of the circuit.

On the other hand, the work associated with the position detection is not required to provide an immediate response. Thus, received data maybe once stored in a memory, such that a small number of despreading circuits are repeatedly used to avoid an increase in the circuit scale. However, in a plurality of base stations, signals from remote base stations are weaker than those from nearby base stations, so that the correlation calculation must be performed for a long time period. For storing data over such a long time period, a large amount of memory is required.

The correlation calculation performed for a long time period involves another problem which will be discussed below. Some mobile stations for use in mobile communications may employ a local oscillator which is not so high in frequency accuracy for purposes of reducing the cost, and is synchronized to a nearby base station to reduce a carrier frequency offset (auto frequency control (AFC) function). However, the limited capability of the AFC function causes several Hz of frequency difference to remain between a mobile station and a base station, so that complete synchronization cannot be achieved even if no fading occurs. For this reason, the phase of a received signal presents a slow rotation at several Hz. Thus, even if the user of a mobile station is stationary or is slowly moving at about a walking velocity, a received signal goes rotating, thereby presenting difficulties in performing coherent adding for a long time period.

Here, the coherent adding refers to a process for adding a signal while correcting the phase of the signal. With the coherent adding performed for N codes, desired signal components have the power $N^2$ times as much, while noise power or interference power is N times. Thus, the signal to noise power ratio is improved by a factor of N. However, the rotation of the phase prevents the coherent adding of a desired signal, so that such effect is reduced.

Since a signal from a remote base station equivalently has a reduced S/I (signal to interference power ratio), the number of times of the coherent adding is desirably increased to improve the signal quality. However, due to the foregoing phenomenon of phase rotation, the number of times of the coherent adding cannot be increased beyond a certain limit. For example, with a mobile station which employs a carrier frequency at 800 MHz and presents a frequency stability of 0.01 ppm after AFC, the frequency of the phase rotation is calculated to be 8 Hz. Assuming that the limit of phase rotation required for the coherent adding is within 45 degrees, it is understood that the coherent adding can be performed within 0.015625 seconds (=⅛×45/360). If the coherent adding were performed for a time period longer than that, the result would be rotation of a signal vector which causes deteriorated S/I on the contrary.

SUMMARY OF THE INVENTION

The above problem is solved by a wireless location handset apparatus for estimating the position of a mobile station using signals coming from at least first and second base stations in a cellular communication system, wherein the amount of phase rotation for a signal received from the first base station is estimated, and the wireless location handset apparatus comprises a memory circuit for storing the received signal compensated for the phase rotation.

A periodic signal is transmitted from a cellular base station. The memory circuit has a capacity for accumulating the signal for one cycle. Newly received information is added to information previously accumulated in the memory circuit, and the resultant information is again accumulated to eliminate the memory capacity exceeding the capacity for one cycle of the signal. It should be noted that since a pilot signal transmitted from a CDMA base station is a non-modulated signal, the same pattern is repeated at PN code cycles of 26.6 milliseconds (ms). In this case, therefore, the memory circuit is required to have only a capacity for storing information for 26.6 ms.

According to the present invention, for locating a mobile station using a cellular communication system, it is possible to reduce the circuit scale and the amount of memory as well as to reduce the number of times of operations required for long-period coherent adding.

DESCRIPTION OF THE EMBODIMENTS

Figure 1:
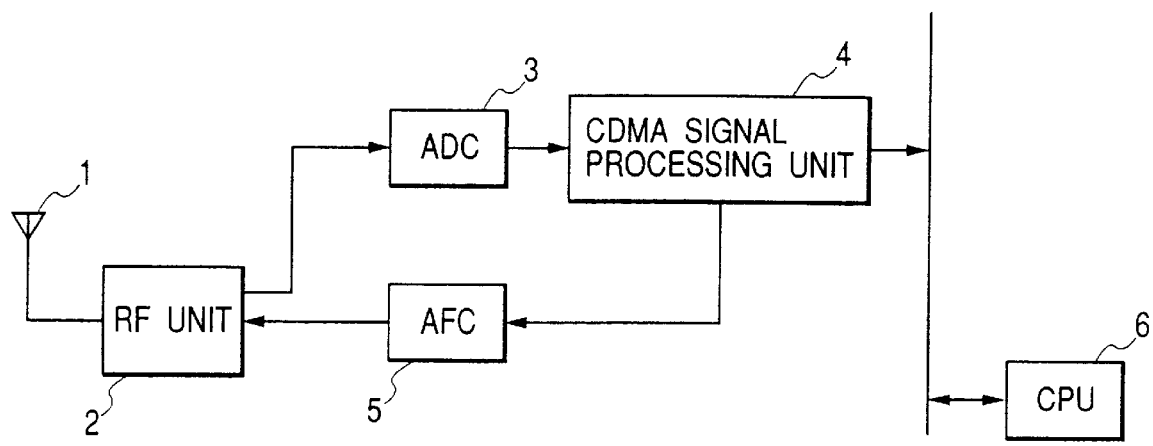
FIG. 1 is a block diagram illustrating the configuration of a mobile station according to a first embodiment of the present invention.

FIG. 1 illustrates an embodiment of the present invention.

A signal received by an antenna 1 is converted to a baseband signal by an RF unit 2. The converted signal is again converted to a digital signal by an A/D converter 3. A CDMA signal processing unit 4 serves to measure a reception timing for a reference signal emitted from a base station. The reception timing can be captured by performing a correlation calculation (despreading) of the received signal with the reference signal. The CDMA signal processing unit 4 also receives information on the base station. For example, in a cellular system conforming to the cdma-One scheme, a timing at which each base station transmits the reference signal can be known from an offset value of a PN code transmission timing stored in a SYNC channel. Thus, the transmission timing can be calculated. A mobile station subtracts the transmission timing from the reception timing to find a propagation delay. A CPU 6 is a unit which estimates a propagation distance from the transmission and reception timings thus obtained to estimate the position of the mobile station from the resulting information.

Figure 2:
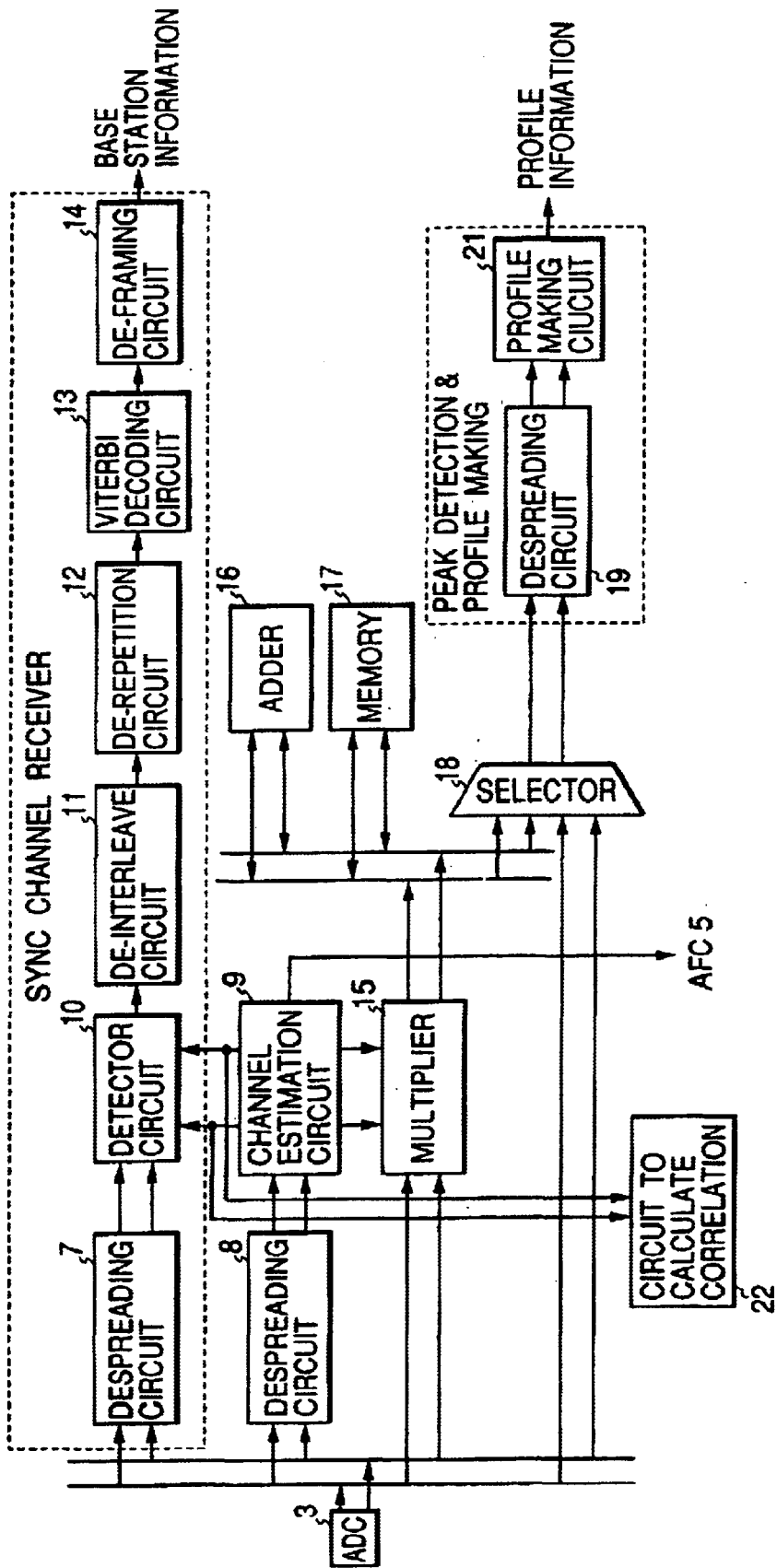
FIG. 2 is a block diagram illustrating the configuration of a CDMA signal processing unit in the mobile station according to the first embodiment of the present invention.
Figure 3:
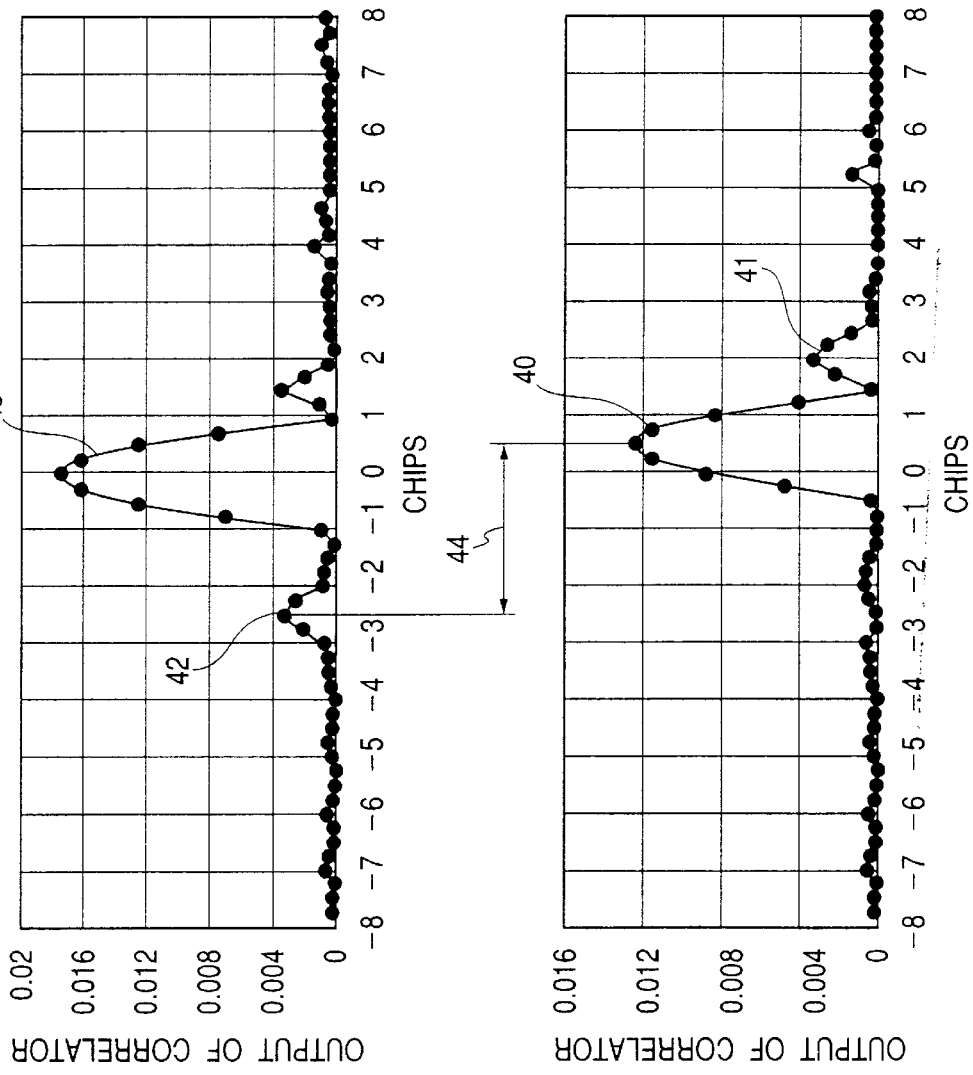
FIG. 3 shows results of correlation calculations performed on signals received at a mobile station.

FIG. 2 illustrates in detail the CDMA signal processing unit 4.

The output of an A/D converter 3 is selected by a selector 18, and inputted to a peak detection circuit. The peak detection circuit has a despreading circuit 19 and a profile making circuit 21. The despreading circuit 19 performs a sliding correlation operation to search for a path reception timing while changing spreading codes. The profile making circuit 21 is a device for finding an effective path having large power.

A SYNC channel receiver proceeds to an operation for receiving SYNC channels simultaneously transmitted from base stations, when a path is found. The SYNC channel of the CDMA scheme contains information on a transmission timing of a base station, i.e., a PN code timing offset value. This information indicates a delay of a transmission timing with respect to the system time when the base station transmits the PN code, and is relied on to reveal at which timing the base station transmitted a signal. In addition, since the information also includes ID for identifying the base station, the base station can be identified. The base station ID information can be utilized to retrieve the position of the base station. The position information on the base station may be contained in a memory of a mobile station or obtained through a network.

The reception of a SYNC channel is performed in the following procedure. Specifically, a signal generator in a despreading circuit 7 performs despreading at a path phase detected by the peak detection circuit using a spread code of the SYNC channel. A despreading circuit 8 also performs despreading at a path phase detected by the peak detection circuit using a spread code of a pilot channel. A channel estimation circuit 9 averages results of the despreading circuit 8 to estimate a channel. A complex conjugate of the estimated channel is calculated to find a vector for compensating for phase rotation experienced on the channel. A detector circuit 10 multiplies the output of the despreading circuit 8 by a vector for phase rotation compensation to perform detection. Subsequent de-interleave circuit 11, de-repetition circuit 12, Viterbi decoding circuit 13, de-framing circuit 14 are a group of units for decoding channel encoding which has been performed for transmitting information, and for dissembling frames. Base station information (including a PN code timing offset, base station ID, and so on) included in the SYNC channel is extracted by passing the SYNC channel through these units.

A difference in frequency between the mobile station and the base station is sensed from the result of the channel estimation circuit 9 to make control information on the AFC 5 in FIG. 1. In addition, an estimated channel may be relied on to estimate phase rotation of the received signal. A multiplier 15 compensates for the phase rotation of the received signal. The received signal, after the phase rotation thereof has been suppressed, is accumulated in a memory circuit 17. Here, the memory circuit 17 is capable of accumulating data for the length of a PN code for a pilot signal. Information for the length of a subsequently received PN code is added to the information previously accumulated in the memory circuit 17 in an adder 16, and the result is again accumulated in the memory 17. As a result, the information accumulated in the memory circuit 17 is updated. As the update is performed a larger number of times, S/I (signal to interference power ratio) is improved.

Figure 4:
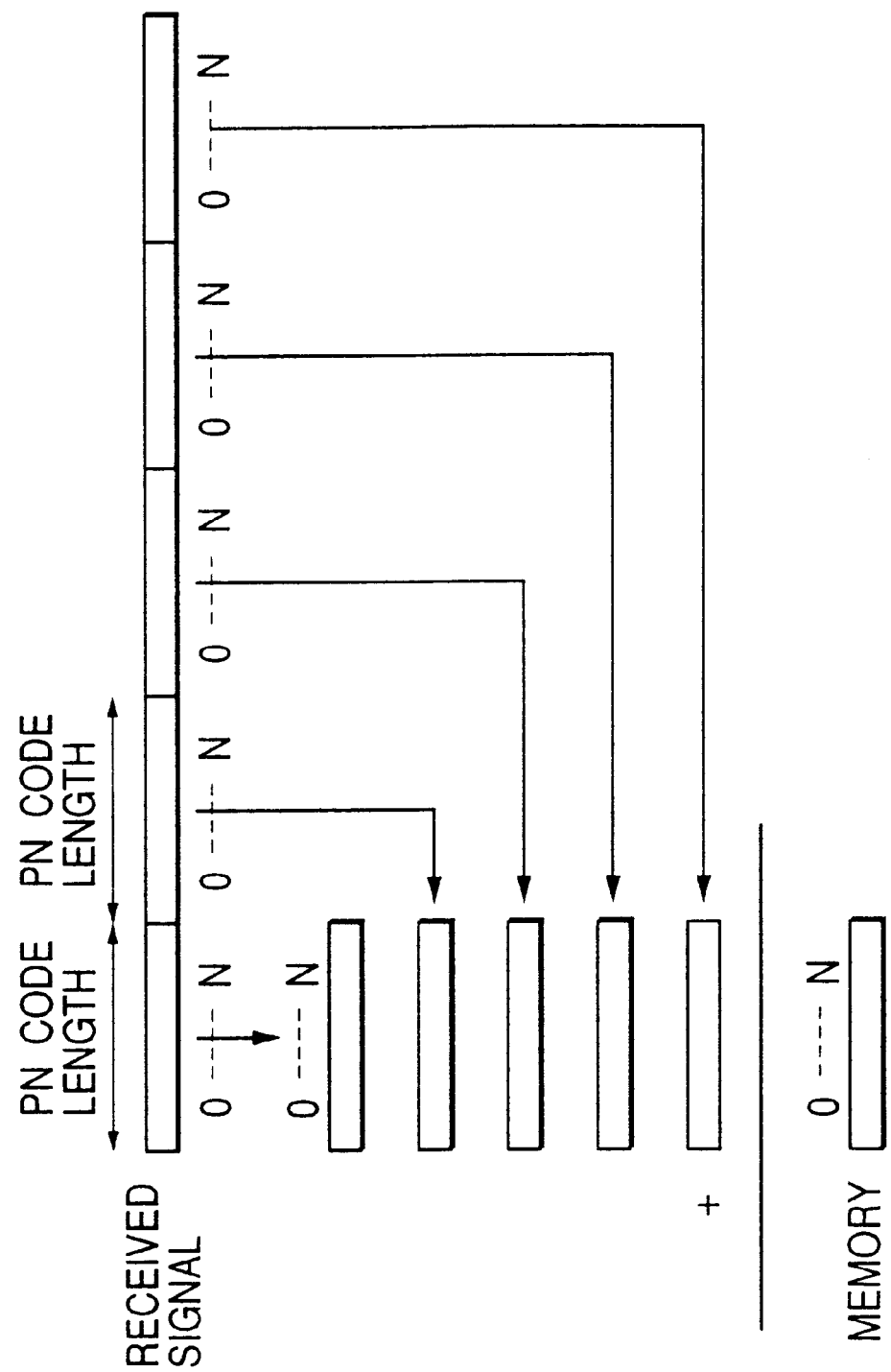
FIG. 4 shows a method of accumulating information in a memory circuit.

Next, a method of performing the coherent adding will be described with reference to FIG. 4. A pilot signal within received information is a non-modulated signal which repeats completely the same pattern every PN code cycle. Since the synchronization is ensured between respective base stations by GPS, the pilot signals will not slip with each other. In addition, the received pilot signal is compensated for rotation by the channel estimation circuit 9 and the multiply circuit 15 in FIG. 2. Thus, the results of the accumulation in respective code cycles are added at matched sample timing to implement the coherent adding of the pilot signal in the received signal. FIG. 4 shows that signals sampled at the same sample timing in each of cycles 1 to N are added in this order.

Next, the compensation for rotation will be described. The phase rotation is estimated using a signal from the base station which exhibits the best quality of a received signal. The rotation of the phase of a received signal is caused by an offset in carrier frequency between a base station and a mobile station, or by the influence of fading due to a varying channel.

Since a frequency offset between base stations is small, the carrier frequency offsets related to all base stations can be compensated for by rotation compensation which has been derived from a signal transmitted from a particular base station. Since the frequency offset is a small offset value of variations in time, a linear compensation, which estimates the offset value by a statistical calculation, is effective for addressing the frequency offset. The use of this method enables a frequency offset to be estimated even from a previously received signal. Of course, the compensation for the frequency offset can be effectively implemented by an approach of estimating a channel every PN code cycle or every frame cycle to estimate the amount of phase rotation compensation in the next cycle.

On the other hand, since the influence of fading on the base stations is different from one base station to another, information from a single base station cannot be relied on to compensate for signals from all the base stations. Therefore, if the fading largely affects, the coherent adding must be cut off after a proper number of times by certain approach.

A condition on which the coherent adding is cut off will be described below. The despreading circuit 8 and the channel estimation circuit 9 for estimating a channel estimate channels of pilot signals from a plurality of base stations instead of only one. The circuit to calculate correlation 22 calculates the value of correlation for the results of estimations made by these different base stations. A smaller absolute value of the correlation indicates a larger influence of fading. Therefore, the accumulation of information in the memory circuit 17 is cut off when the correlation value falls below a threshold value. A proper threshold value may be approximately 0.7, by way of example. This value corresponds to rotation of 45 degrees of a signal from a second base station with respect to a signal from a first base station, and means a deterioration of approximately 3 dB.

Another condition on which the coherent adding is cut off will be described below. A concern with the coherent adding is an increased difference in the amount of phase rotation between the respective base stations. Thus, channels are estimated from pilot signals of a plurality of base stations, and the difference in phase rotation of the channel is found between the base stations. If the difference increases beyond a certain value, this indicates increasing influence of the fading on the channel, so that the accumulation of information in the memory circuit 17 is cut off. For example, the accumulation is cut off on condition that the difference in phase rotation exceeds 45 degrees. This condition corresponds to the correlation value of 0.7 when the cut-off of the accumulation is determined based on the correlation value.

After the data has been accumulated in the memory circuit 17 for proper PN code cycles based on any of the foregoing cut-off conditions, the selector 18 is switched to input the contents accumulated in the memory circuit 17 to the peak detection circuit. In this way, the pilot signal accumulated in the memory circuit 17 can be despread. Since the received data is accumulated in the memory circuit 17, the same information can be repeatedly provided any number of times. If the signal phase is changed in the despreading circuit 19, the despreading can be performed with a varying amount of delay. It is therefore possible to make a delay profile without increasing the scale of the despreading circuit. In addition, since the memory circuit 17 only requires a capacity enough to store data for one PN code cycle, the scale of the memory circuit 17 can also be reduced. A coherent adding circuit 20 is a unit for performing the coherent adding for the length of PN code. Since the coherent adding extending over a plurality of PN code lengths has been completed at the time the data is accumulated in the memory circuit 17, the coherent adding operation is sufficient for the PN code length. It is therefore possible to reduce the number of times of operations required to make a delay profile.

For reducing the scale of the memory circuit 17, the number of over sampling is desirably reduced. Since an interpolation is performed for estimating a peak value from the previously made profile, information accumulated in the memory circuit 17 may be twice time over sampling to improve the effect of reduction in the amount of memory.

What is claimed is:

1. A wireless location handset apparatus for estimating a position of a mobile station using signals coming from at least first and second base stations in a cellular communication system, wherein an amount of phase rotation for signals received from said base stations is estimated based on a signal received from said first base station of which a reception quality is higher than that of a signal received from said second base station, said wireless location handset apparatus comprising:

a memory circuit for accumulating said received signals compensated for the estimated phase rotation.

2. A wireless location handset apparatus according to claim 1, further comprising:

an adder synchronized to a signal periodically transmitted from said first base station for adding said received signal compensated for the phase rotation to information previously accumulated in said memory circuit, said compensated signal and said information having cycles of same duration and being chronologically aligned .

3. A wireless location handset apparatus according to claim 2, further comprising:

a phase rotation estimation circuit for estimating an amount of phase rotation with respect to said second base station; and a phase difference calculating circuit for calculating a difference in the amount of phase rotation between said first and second base stations, wherein said received signal accumulated in said memory circuit is repeatedly updated as long as said difference in the amount of phase rotation is equal to or less than a threshold value.

4. A wireless location handset apparatus according to claim 2, further comprising:

a phase rotation estimation circuit for estimating an amount of phase rotation with respect to said second base station; and a circuit to calculate correlation for calculating the correlation of the amount of phase rotation with respect to said first base station to the amount of phase rotation with respect to said second base station, wherein said received signal accumulated in said memory circuit is repeatedly updated as long as the value of said correlation is equal to or greater than a threshold value.

5. A wireless location handset apparatus according to claim 1, wherein said memory circuit accumulates information resulting from performing sampling at a sampling rate that is twice the rate inherent to the sampled signal.

* * * * *